(12) United States Patent
Gordon et al.

(10) Patent No.: US 6,535,514 B1
(45) Date of Patent: Mar. 18, 2003

(54) METHOD AND APPARATUS FOR FAST PROCESSING OF SELECTED PACKETIZED DATA REQUESTS

(75) Inventors: Charles Gordon, Ashland, MA (US); William E. Peisel, Framingham, MA (US)

(73) Assignee: Netsilicon, Inc., Waltham, MA (US)

( * ) Notice: Subject to any disclaimer, the term of this patent is extended or adjusted under 35 U.S.C. 154(b) by 0 days.

(21) Appl. No.: 09/332,280

(22) Filed: Jun. 11, 1999

(51) Int. Cl.[7] .................................................. H04J 3/24
(52) U.S. Cl. .................................. 370/395.42; 370/401
(58) Field of Search ..................... 370/395.42, 395.43, 370/412–419, 389, 392, 395.3, 395.31, 401, 410

(56) References Cited

U.S. PATENT DOCUMENTS

| | | | | |
|---|---|---|---|---|
| 5,425,026 A | * | 6/1995 | Mori ............................ | 370/410 |
| 5,535,202 A | * | 7/1996 | Kondoh ....................... | 370/395.7 |
| 5,617,416 A | * | 4/1997 | Damien ...................... | 370/395.42 |
| 5,734,911 A | | 3/1998 | Lai | |
| 5,768,273 A | * | 6/1998 | Aznar et al. ............... | 370/395.42 |
| 6,011,798 A | * | 1/2000 | McAlpine ................... | 370/395.42 |
| 6,101,188 A | * | 8/2000 | Sekine et al. .............. | 370/401 |
| 6,363,069 B1 | * | 3/2002 | Levy et al. ................. | 370/389 |
| 6,407,998 B1 | * | 6/2002 | Polit et al. ................. | 370/395.42 |
| 6,407,999 B1 | * | 6/2002 | Olkkonen et al. ......... | 370/395.42 |
| 6,408,006 B1 | * | 6/2002 | Wolff ......................... | 370/395.42 |

FOREIGN PATENT DOCUMENTS

WO      WO 97/33407       9/1997

OTHER PUBLICATIONS

Integrating Non–IBM Software with Operating System Functions, IBM Technical Disclosure Bulletin, Nov. 1991, pp. 381, 382, vol. 34, No. 6, Armonk, NY.

* cited by examiner

*Primary Examiner*—Salvatore Cangialosi
(74) *Attorney, Agent, or Firm*—Fish & Richardson P.C.

(57) ABSTRACT

A method and apparatus are provided for permitting selected requests to a data processing system received in a selected packetized format, and in particular hard real time requests, to receive accelerated "fast" processing. Each packet includes a field normally used for controlling routing of the request, for example a "port" field, which may contain selected codes for requests to receive fast processing. A table containing such special codes and an address pointer for each such code is also stored, incoming requests having a code in the selected field matching a code in the table being routed either for priority processing by an application at the pointer address, bypassing certain preliminary processing, or being routed to incorporate data at a buffer located at the pointer address into a packetized reply message.

24 Claims, 1 Drawing Sheet

METHOD AND APPARATUS FOR FAST PROCESSING OF SELECTED PACKETIZED DATA REQUESTS

FIELD OF THE INVENTION

Figure 1:
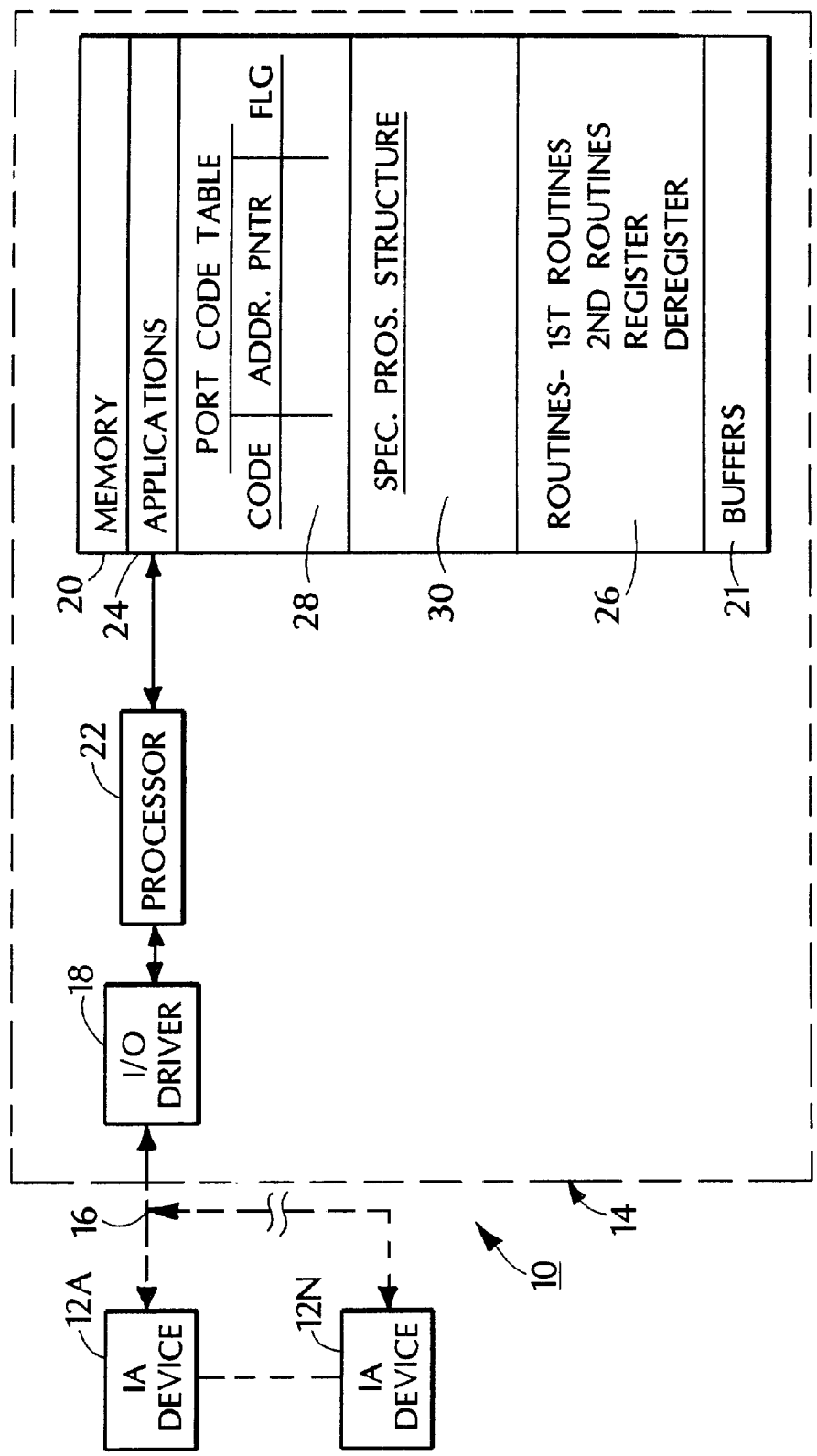

This invention relates to the processing of requests received in a selected packetized format, and more particularly to a method and apparatus for the accelerated processing of selected such requests, particularly hard real-time requests, such as those involved in industrial automation.

BACKGROUND OF THE INVENTION

While there is always a desire for data processing requests to be processed quickly, response time, which is sometimes also referred to as turn-around time, is particularly critical for hard real-time applications, these being applications such as those in industrial automation where the processor is being utilized to control an ongoing process in real-time. For example, in an industrial automation process, a robot may have sensors which are scanned at frequent intervals, the sensor outputs being used to control a feedback process to the robot. It is frequently desirable that such processes operate with a turn-around time in the submillisecond range. However, while it is possible to obtain such processing speeds utilizing parallel processing techniques, supercomputers or other high cost devices, most hard real-time applications cannot justify the cost of such hardware and generally utilize PC's or comparable hardware having turn-around times which are normally greater than one millisecond and, with even lower costs equipment, can be ten milliseconds or more.

A need therefore exists to permit low cost data processors, typically operating with turn-around times of one to ten milliseconds or more, to be able to perform selected hard real-time operations, particularly industrial automation applications, with turn-around times in the submillisecond range with little, if any, increase in hardware costs and with minimal software burden.

SUMMARY OF THE INVENTION

In accordance with the above, this invention provides a method and apparatus for permitting selected requests to a data processing system to be identified when received and to be handled in an expedited manner, eliminating certain steps in the operation not required for such requests and receiving processing priority. In particular, requests received in practicing the teachings of this invention are received in a packetized form, the packets being in accordance with a predetermined protocol which is preferably an Ethernet protocol. Each packet includes a field normally used for controlling routing of the request, which field is a "port" field for preferred embodiments. Selected codes in this field identify a request as a hard real-time or other request requiring rapid processing. A table is stored containing as a minimum, an entry for each of the selected codes and an address pointer to either a buffer containing a response to the packet or to an application stored in memory, which application is appropriate for processing the corresponding request. A routine (first routine) is also provided which compares the code in the given field, for example the port field, of an incoming request with codes stored in the table, passes requests with codes not in the table for normal processing and initiates an expedited processing, depending on the code, for requests having a code matching a code in the table. Where the pointer is to an address storing an application for processing the request, the first routine establishes a special process structure for the request, and routes such matching requests for priority processing by the application at the corresponding pointer address. Where the application causes a reply output to be generated, for example a feedback instruction to a robot or other machine used in an industrial automation application, the routine utilizes the special process structure to provide priority routing of a reply output to output circuitry. For example, where an Ethernet protocol is utilized for requests/replies and Ethernet routines have priority over other routines being run on the processor, first routines may be treated by the data processor as Ethernet routines. For such systems, the output circuitry would be an Ethernet driver. Where the address pointer is to a buffer containing information for a response to the request, the information at the pointer address is utilized to create a packetized reply.

One way in which requests afforded fast processing in accordance with the teachings of this invention may be processed approximately an order of magnitude faster than other requests applied to the system is that certain time consuming second processing routines normally performed on all requests are not required for the selected requests and are not performed. If a particular request requires one or more of these second processing routines, the request is either not routed for fast processing, or is routed for fast processing to perform a portion of the processing which may be expeditiously performed by the first routines to facilitate hard real-time operation and is also performed with the second routines for selected purposes.

A routine may also be provided for making an entry into the table, this "register" routine responding to an application request to store at least a selected code and address pointer. The register routine may also store selected flags for an entry. Finally, the apparatus may include a deregister routine which is operative for removing entries from the table.

The foregoing and other objects, features and advantages of the invention will be apparent from the following more particular description of preferred embodiments of the invention, as illustrated in the accompanying drawings.

IN THE DRAWINGS

The FIGURE is a schematic block diagram of an illustrative system suitable for use in practicing the teachings of this invention.

DETAILED DESCRIPTION OF THE DRAWINGS

Referring to the drawing, an illustrative system 10 is shown which system may be utilized for practicing the teachings of this invention. The system includes at least one and preferably a plurality of industrial automation (IA) devices 12A–12N or other hard real-time devices which interface with a control apparatus 14 through a single suitable data transfer link 16 or through separate links. Depending on application, link(s) 16 may be a telephone line, a cable or other electrical connection, an optical transmission link, an RF transmission link or other mechanism known in the art for transmitting data packets between two devices. The same or different transmission media may be used for devices 12. Transmit and receive elements appropriate for the transmission medium 16 are included in each of the devices 12 and in apparatus 14. For purposes of the following discussion, it will be assumed that requests transmitted from a device 12 to control apparatus 14 are in an appropriate Ethernet packetized protocol, and preferably that such protocol is used for transmitting requests/replies in both directions across media 16. The packetized data protocol used may for example be a datagram protocol such as UDP, IPX or IPC, or may be a connection oriented protocol, such as TCP, SPX or SPP. For an illustrative embodiment, the protocol utilized is UDP (unit data packet). If a connection oriented protocol is used, TCP (transmission control protocol) would be utilized for a preferred embodiment.

Packetized data for any of the above protocols includes an internet link address, various format data used for hand shake and error correction, a port field used for routing requests at the receiving location, and one or more fields containing instructions, data or the like. Typically, a service request from a device 12 is received at an IO driver 18, for example an Ethernet driver, of control apparatus 14 and is stored in an appropriate buffer, for example a buffer 21 in memory 20. Memory 20 also stores certain first routines (section 26) which are run on processor 22 when a request is received to perform selected preliminary processing on the request and then to pass the request on for further processing in processor 22 under control of selected second routines. Buffering of the request, or portions thereof, may also occur during the processing under control of the second routines. Once the preprocessing under control of the first and second routines has been completed, an application appropriate for the request is selected from applications 24 stored in memory 20, there generally being an application 24 for each processing operation which may be required on an incoming request. For example, an application may merely store selected data from a request, for example sensor outputs, may process such data to put it in a selected format before storing, may process received data to obtain other information to be stored, or may process a request to obtain information to be returned, normally to the IA device 12 providing the request; however, this is not a limitation on the invention and in some applications information received for example from a sensor device may be utilized to control some other device, for example a servo motor, heater, flow valve or the like, at the same or a related location.

If the application generates a reply, the reply is normally processed in processor 22 under control of selected second routine(s), such processing generally also involving buffering steps, and is then processed under control of selected first routine(s) before being returned to driver 18 to be queued for transmission to the appropriate IA device 12 or other location. As indicated above, in even the fastest PCS, the above process takes at least one millisecond, and may take ten or more milliseconds in some commonly used systems, a turn-around time which is unacceptable for many hard real-time applications where response times in the submillisecond range are required. The following describes a technique for overcoming this limitation in an illustrative system.

In accordance with the teachings of this invention, certain ports in the port field of an Ethernet packet are selected and stored. When a request is received at apparatus 14 which has one of the stored codes in its port field, this request is routed for fast processing by bypassing the preprocessing and buffering performed in processor 22 by the second routines on both the incoming request and any reply and by assigning a higher priority to such requests, then other requests, thereby permitting such requests to have a turn-around time of 0.3 to 0.4 ms, or roughly one third to one thirtieth, the turn-around time required if such fast processing is not performed.

More specifically, the system stores a registration routine in routines section 26 of memory 20 which processor 22 may utilize to store a fast processing port number or code in port code table 28. Table 28 contains an entry for each port number/code for which fast processing is desired. Each entry in this table includes the appropriate port code, an address pointer to a location in portion 24 of memory where the application for processing a request containing the port code is stored and, where appropriate, one or more flag bits. For example, a multicast flag bit may be sent if fast processing is also to be permitted on multicast packets and a broadcast flag bit may be provided, this bit being set if broadcast packets are to be fast processed. If these bits are not set, then notwithstanding the fact that a request contains a port code stored in table 28, fast processing will not be performed on the request if it is a multicast or broadcast packet. For an illustrative embodiment, the register routine may return one of three messages to processor 22 upon completion of the routine. These returns are "success," meaning that the fast IP port number or code has been registered in table 28; "port already registered" meaning that the port number or code is already registered in table 28; or "table full" meaning that table 28 is full and unable to receive additional entries. The size of table 28 will vary with application and may, for example, be from 50 to 100 entries for an illustrative embodiment.

When a port number/code is no longer to be used by the system, processor 22 executes the "deregister" routine from section 26 of memory 20. This routine removes an entry from port code table 28. For an illustrative embodiment, on the completion of this routine, a message is returned to processor 22 which is either a "success" message, indicating that the entry has been removed from table 28, or a "port not registered" message, indicating that the port number or code was not found in table 28.

In accordance with the teachings of this invention, the first routines are modified to perform certain additional functions on incoming requests. In particular, the port number or code of each incoming request to driver 18 is compared against port codes stored in table 28. So long as no match is found, the incoming request is processed in the manner described above utilizing the first routines, the second routines and an appropriate application. However, when a matching code is found in the port field of an incoming request, the first routine accesses a pointer to a special processing structure 30 which is updated to contain information about the received packet. The information in this structure for an illustrative embodiment includes the following fields:

| Field Name | Field Function | How Field Used |
| --- | --- | --- |
| Request Port | Port Number of Request | Field is set to the port number of the received packet |
| Reply Port | Set to Destination Port | Before the request is processed, the IO driver circuit loads this field with the port number where the reply is to be |

-continued

| Field Name | Field Function | How Field Used |
|---|---|---|
| | | sent, which is normally the port number of the receive packet, but need not be. Alternatively, if a reply is to be sent, the application processing the request may load this field with a destination port number for the reply. Again, in most cases this will be the source port number of the request, but need not be. |
| Received Data | Contents of Data Portion of Received Packet | Pointer to data section of the incoming packet. This buffer is controlled by the IO driver/processor. The application does not write into this buffer after the processing routine returns and the contents of this buffer may change immediately after the processing routine returns. If the application needs to save the contents of this buffer, a "pass up" bit is set by the application in its return so that the packet is passed to processor 22 for standard processing. |
| Received Length | Length of Data Portion of Received Packet | Length of the data section of the incoming packet. |
| Reply Data | To be Set by Application to Address of Reply Packet | If a reply is to be sent, the application processing routine loads this field with the address of the data to be transmitted. The buffer containing this packet must be addressable from the IO driver/processor. |
| Reply Length | Length of Reply Data | Number of bytes in the buffer pointed to by reply data. |
| Reply Must be Copied | Set if Reply Data Must be Copied | This field is set if the contents of the reply buffer must be copied to an intermediate transmit buffer. The field is set to zero if the buffer does not need to be copied. The IO driver/processor may use a DMA (direct memory access) to transfer packets to be transmitted in parallel with the operation of processor 22, it thus being possible for packets to be transferred while other processes are being run. Generally, if the contents of the buffer are static, or if the contents are always valid even while being updated, then this field should be set to zero for maximum performance. If it is possible for the contents of the buffer to be invalidated while the packet is being DMA'd, then this field should be set. |
| Failure Field | Pointer to Application Error Analyst | Field loaded with a routine to call if 10 driver/processor is unable to send the reply packet. This field is optional and may be set to null if not needed. |
| Send Reply | Bit Causing Reply Buffer to be Sent to Request Initiating Source | This bit, generally set by the application, will cause the reply buffer supplied by the application to be sent to the device that originated the request packet. |
| Pass Up | This Bit Causes the Receive Packet to be Passed to the IP Stack | This bit which may be set by the application causes the received packet to be passed to the IP Stack and can be useful if the application needs to have processing performed on the incoming request packet beyond that which can be performed by the fast processing routine. If this bit is not set, the packet is discarded after fast processing. |

Once special processing structure 30 has been established for an entry, any additional preprocessing normally performed by the first routines are performed on the request, and the first routines then access the application at the pointer address indicated in port code table 28 for the port code of the request. Processor 22 gives priority to requests received directly from the first routines over requests being normally processed by apparatus 14.

As indicated earlier, the specific functions performed by the application during fast processing because of the limited preprocessing available and other limitations, are generally relatively simple functions required in IA and other fast hard real-time applications. Where a request requires processing beyond that which can be accomplished by the fast processing routines, enough of the processing is done by fast processing to satisfy response time requirements and subsequent normal processing is done on the request to update stored records and perform other operations which cannot be performed during the fast processing.

If the request processed by the application does not require a response, then once processing by the application is completed, further actions are normally not required. However, if the application involves the generation of a response to the request, the second routines normally performed on such responses are bypassed. Instead, the application completes appropriate fields in structure 30 for the reply. In particular:

| Field | Action |
|---|---|
| Reply Port | Set to destination port number of reply package |
| Reply Data | Set to beginning of data section containing reply |
| Reply Link | Set to link of data portion of reply packet |
| Reply Must Be Copied | Set if reply packet must be copied to intermediate buffer |
| Failure | Loaded with address of routine to call if unable to send reply |

If the SEND REPLY bit is set, the application branches to an appropriate first routine, bypassing second routines normally performed on a reply, the selected first routines entering the reply packet into a transmit queue and a data block to hold the packet header. If the REPLY MUST BE COPIED is set, then the routine also allocates a data block large enough to hold the reply data. For an illustrative embodiment, if the routine is unable to allocate the buffers, then the attempt to transmit the reply is aborted. However this is not a limitation on the invention. If FAILURE is not null, then the appropriate failure routine may be called at this time. The selected first routine also creates an Ethernet and other header for the protocol utilized utilizing information in the incoming packet and the information stored in structure 30. If REPLY MUST BE COPIED is set, then the data portion of the reply is copied to the previously allocated buffer. Finally, the buffers are chained together and placed in the transmit queue.

When all processing on a given request has been completed, including processing of a reply where appropriate, the PASS UP field for the request in structure 30 is queried. If this field is not set, the request is discarded. If this field is set, the incoming request is passed to the second routines and is processed as a normal request. This would be done where the rapid response required for an IA or other hard real-time application is required for at least some portion of the request, but the request also involves storing and updating information at apparatus 14 or performing other operations requiring the preprocessing steps of the second routines which steps are not performed during fast processing operation.

The fast processing routines may also include various error reporting routines which are called up in the event the IO driver/processor is unable to process an incoming request and/or to send a reply package. The error reporting function may be nulled so that errors are not reported.

While the procedure described above results in significantly reduced turnaround time for certain hard real time and other applications where fast turnaround time is required, there are applications where the invention may provide even faster turnaround time. In particular, there are applications where the incoming message is merely an indication that the IA device requires a selected type of data. For example, a robotics device may need a sensor reading, or may need a position parameter determined for the device by processor 22 in response to previously received readings. Such requests can be handled very quickly by modifying the port code table so that the address pointer for selected port codes, instead of storing an address for an application to be run, store an address for a data buffer 21 which contains the data being requested. This data is generated and stored prior to the receipt of the request so that when a request comes in, the most recent responsive data is available. Entries of this type are made in the port code table by the register routine in the same manner previously described.

When a request having one of these port numbers is received, the data at the indicated buffer is accessed and used as the data portion of a reply data packet, the information for the remaining fields of the reply packet being obtained from the incoming message. This reply packet is then entered into the transmit queue of I/O driver 18 to be transmitted to the appropriate device 12. Since these responses do not involve full use of first routines nor do they involve applications or second routines, very fast turnaround times can be obtained.

While in the discussion above it has been assumed that all operations are performed by a general purpose processor 22 under program control, this is not a limitation on the invention, and various ones of the functions may be performed by hard wired circuitry in conjunction with a programmed processor. Further, while it is assumed above that all operations are performed in a single processor 22, a separate preprocessor may be provided for performing selected ones of the routines 26, for example the first routines, or all of the routines 26, with applications and other functions being provided by a processor such as processor 22. Other variations on the embodiment shown are also possible. Thus, while the invention has been particularly shown and described above with reference to an illustrative embodiment, the foregoing and other changes in form and detail may be made therein by one skilled in the art while still remaining within the spirit and scope of the invention which is to be defined only by the appended claims.

What is claimed is:

1. Apparatus for receiving and processing multifield packetized data requests comprising:

a processor; and memory storing a table containing codes, said table including at least the code and an address pointer, and a routine executed by said processor on receipt of a request that compares the code in a port field of each incoming request with codes stored in said table, passes requests with codes not in the table to a beginning address of a request handling process and passes requests having a code matching a code in the table to an intermediate address within the request handling process, the intermediate address stored in the address pointer.

2. Apparatus as claimed in claim 1 wherein said memory also stores a plurality of applications, each controlling the performance by the processor of a selected processing function, wherein each address pointer in said table is to a said application for processing the request; and wherein said expedited processing includes establishing a special processing structure for the request, and routing such requests for priority processing by the application at the corresponding address pointer.

3. Apparatus as claimed in claim 2 wherein at least some of said applications cause a reply output to be generated, and wherein said routine utilizes said special process structure to provide priority routing of a said reply output to output circuitry of said apparatus.

4. Apparatus as claimed in claim 3 wherein requests to said apparatus and output replies from said apparatus are transmitted over Ethernet, said apparatus having Ethernet routines which receive priority handling, and wherein said routine is treated by the apparatus as an Ethernet routine.

5. Apparatus as claimed in claim 2 wherein requests routed for normal processing have processing routines performed on them which are not performed on requests routed for priority processing, thereby reducing the time for processing such requests.

6. Apparatus as claimed in claim 5 wherein requests routed for priority processing without said processing routine are also routed for normal processing including said processing routines.

7. Apparatus as claimed in claim 5 wherein at least some of said applications cause a reply output to be generated, and wherein said processing routines are also bypassed for reply outputs.

8. Apparatus as claimed in claim 1 including a register routine for making an entry into said table, said register routine responding to an instruction to store at least the selected code for the entry and the corresponding address pointer.

9. Apparatus as claimed in claim 8 wherein said register routine also stores selected flags for each entry.

10. Apparatus as claimed in claim 1 including a deregister routine which is operative for removing entries from said table.

11. Apparatus as claimed in claim 1 wherein each said request has a port field used for request routing, and wherein said given field is the port field.

12. Apparatus as claimed in claim 1 wherein said address pointer is to a buffer containing information for a response to said request, and wherein said routine utilizes said information to create a packetized reply.

13. A method for receiving and processing multifield packetized data requests comprising:

storing a table containing codes, said table including at least the code and an address pointer; and on receipt of a request comparing the code in a port field of each incoming request with codes stored in said table, passing requests with codes not found in the table to a beginning address of a request handling process, and initiating processing at an intermediate address of the request handling process, the intermediate address stored in the address pointer, for requests having a code in the port field matching a code in the table.

14. A method as claimed in claim 13 including storing a plurality of applications, each controlling the performance by a processor of a selected processing function, wherein each address pointer in said table is to a said application for processing the request; and wherein said routine includes establishing a special process structure, and routing such requests for priority processing by the application at the corresponding address pointer.

15. A method as claimed in claim 14 wherein at least some of said applications cause a reply output to be generated, and wherein the step of performing said routine includes utilizing said special process structure to provide priority routing of a said reply output to output circuitry of said apparatus.

16. A method as claimed in claim 14 wherein requests routed for normal processing have processing routines performed on them which are not performed on requests routed for priority processing, thereby reducing the time for processing such requests.

17. A method as claimed in claim 16 wherein requests routed for priority processing without said processing routines are also routed for normal processing including said processing routines.

18. A method as claimed in claim 16 wherein at least some of said applications cause a reply output to be generated, and wherein said processing routines are also bypassed for reply outputs.

19. A method as claimed in claim 13 including performing a register routine for making an entry into said table, said register routine responding to an instruction to store at least the selected code for the entry and the corresponding address pointer.

20. A method as claimed in claim 19 wherein said register routine also stores selected flags for each entry.

21. A method as claimed in claim 13 including performing a deregister routine which is operative for removing entries from said table.

22. A method as claimed in claim 13 wherein each said request has a port field used for request routing, and wherein said given field is the port field.

23. A method as claimed in claim 13 wherein said address pointer is to a buffer containing information for a response to said request, and wherein said routine utilizes said information to create a packetized reply.

24. Apparatus for receiving and processing multifield packetized data comprising:

a processor; and memory storing;

(a) a plurality of applications, each controlling a performance by the processor of a selected processing function;

(b) at least one table containing codes, said table including at least the code and an associated address pointer to a said application for processing the request, (c) at least one first routine run by said processor on receipt of a request and on receipt of a reply to a request to control transfer of the request/reply, and (d) at least one second routine normally run on said processor to perform selective processing for requests and replies being transferred between said first routine and said applications;

a said at least one first routine comparing a code in a port field of each incoming request with codes stored in said table, passing requests with codes not in the table for processing using said at least one second routine both for requests and corresponding replies, establishing a special process structure for each request having a code in a port number matching a code in the table, and routing each such request for processing by the application at the corresponding address pointer, the at least one second routines being bypassed for such requests and for corresponding replies.

* * * * *